(12) United States Patent
Kim et al.

(10) Patent No.: US 8,274,551 B2
(45) Date of Patent: Sep. 25, 2012

(54) METHOD AND APPARATUS FOR GENERATING HEADER INFORMATION OF STEREOSCOPIC IMAGE DATA

(75) Inventors: Yong-tae Kim, Seoul (KR); Jae-seung Kim, Yongin-si (KR); Seon-deok Hwang, Jochiwon-eup (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1124 days.

(21) Appl. No.: 12/136,395

(22) Filed: Jun. 10, 2008

(65) Prior Publication Data

US 2008/0303893 A1 Dec. 11, 2008

Related U.S. Application Data

(60) Provisional application No. 60/943,100, filed on Jun. 11, 2007.

(30) Foreign Application Priority Data

Aug. 1, 2007 (KR) ........................ 10-2007-0077460

(51) Int. Cl.
*H04N 15/00* (2006.01)
*H04N 5/92* (2006.01)
*G06K 9/00* (2006.01)

(52) U.S. Cl. ........................ 348/42; 382/154; 386/326

(58) Field of Classification Search ........................ None
See application file for complete search history.

(56) References Cited

U.S. PATENT DOCUMENTS

| | | | |
|---|---|---|---|
| 2003/0053797 | A1 | 3/2003 | Oshima et al. |
| 2004/0008893 | A1 | 1/2004 | Itoi et al. |
| 2006/0177124 | A1 | 8/2006 | Ha |
| 2006/0269226 | A1 | 11/2006 | Ito et al. |

FOREIGN PATENT DOCUMENTS

| | | |
|---|---|---|
| CN | 1450816 A | 10/2003 |
| CN | 1799267 A | 7/2006 |
| EP | 1024672 A1 | 8/2000 |
| EP | 1501317 A1 | 1/2005 |
| EP | 1 524 859 A2 | 4/2005 |
| EP | 1663148 A1 | 3/2006 |
| JP | 2005-26800 A | 1/2005 |
| JP | 2006-13759 A | 1/2006 |
| KR | 10-0704938 B1 | 4/2007 |
| KR | 10-0716142 B1 | 5/2007 |

OTHER PUBLICATIONS

Communication dated May 5, 2011 from the State Intellectual Property Office of P.R. China in counterpart Chinese application No. 200880007918.1.

(Continued)

*Primary Examiner* — Ranodhi Serrao
(74) *Attorney, Agent, or Firm* — Sughrue Mion, PLLC

(57) ABSTRACT

A method and apparatus for using header information of stereoscopic image data is provided. The method includes using three-dimensional reproduction period information related to three-dimensionally reproduced stereoscopic image data of image data recorded in a payload region of the stereoscopic image bitstream, in a header region of the stereoscopic image bitstream; recording camera information related to cameras used for obtaining a stereoscopic image, in the header region; recording parallax information between base and additional images of the stereoscopic image in the header region; and recording the image data in the payload region of the stereoscopic image bitstream.

7 Claims, 14 Drawing Sheets

OTHER PUBLICATIONS

Communication dated Feb. 9, 2011 from the European Patent Office in counterpart European Application No. 08766177.3.
Communication dated Aug. 23, 2011 from the Korean Intellectual Property Office in counterpart Korean Patent Application No. 10-2010-0055473.
Communication dated Oct. 10, 2011 from the European Patent Office in counterpart European Application No. 11179333.7.
Communication dated Feb. 16, 2012 issued by the European Patent Office in counterpart European Patent Application No. 08766177.3.
Communication dated Jun. 5, 2012 from the State Intellectual Property Office of P.R. China in counterpart Chinese application No. 200880007918.1.

| 3D_Period( ) { | Descriptor |
|---|---|
| number_of_3D_period | u(32) |
| for( i = 0; i < number_of_3D_period; i++ ){ | |
| start_position[i] | u(32) |
| end_position[i] | u(32) |
| } | |
| } | |

FIG. 6A

| stereoFormat_params( ) { | Descriptor |
|---|---|
| Stereo_format_type | u(8) |
| LR_first | u(1) |
| LR_width_ratio | u(32) |
| LR_height_ratio | u(32) |
| scaling_method | u(8) |
| If(scaling_method >= 0x03){ | |
| scaling_func() | |
| } | |
| } | |

FIG. 6B

| Stereo_format_type | Descriptor |
|---|---|
| 0 | Vertical line interleaved format |
| 1 | Horizontal line interleaved format |
| 2 | Top-down format |
| 3 | Side-by-side format |
| 4 | Field sequential format |
| 5 | Frame sequential format |
| 6 | Block-interleaved format |
| 7 | Disparity map |
| 8 | Depth map |
| 9 | Disparity + Motion map |
| 10 | Monoscopic image |
| 11~255 | User private |

FIG. 6C

| identification | LR_first = 0 | | LR_first =1 | |
|---|---|---|---|---|
| | Left view | Right View | Left view | Right view |
| Vertical line interleaved format (Parallax barrier format) | Odd line | Even line | Even line | Odd line |
| Horizontal line interleaved format | Odd line | Even line | Even line | Odd line |
| Top-down format | Upper side | Lower side | Lower side | Upper side |
| Side-by-side format | Left side | Right side | Right side | Left side |
| Field sequential format | Odd field | Even field | Even field | Odd field |
| Frame sequential format | Odd frame | Even frame | Even Frame | Even frame |
| Block-interleaved format | Odd number of MB | Even number of MB | Even number of MB | Odd number of MB |
| Two ES | Main media (ES1) | Sub media (ES2) | Sub media (ES2) | Main media (ES1) |
| User private | | | | |

FIG. 7A

| scaling_method | identification |
|---|---|
| 0 | Sampling method |
| 1 | Linear method |
| 2 | Cubic convolution |
| 3~255 | User private |

FIG. 7B

| scaling_func () { | Descriptor |
|---|---|
| number_of_hor_coeff | u(8) |
| for( i = 0; i < number_of_hor_coeff; i++ ){ | |
| hor_scaling_coeff[i] | u(32) |
| } | |
| number_of_ver_coeff | u(8) |
| for( i = 0; i < number_of_ver_coeff; i++ ){ | |
| ver_scaling_coeff[i] | u(32) |
| } | |
| } | |

FIG. 8A

| Stereoscopic_Camera_info( ) { | Descriptor |
|---|---|
| camera_distance | u(32) |
| view_type | u(1) |
| View_distance_vs_depth | u(32) |
| camera_type | u(8) |
| is_camera_params | u(1) |
| if(is_camera_params){ | |
| Camera_params() | |
| } | |
| is_parallax_info | u(1) |
| If(is_parallax_info){ | |
| Parallax_info() | |
| } | |
| } | |

FIG. 8B

| Camera_params() { | Descriptor |
|---|---|
| number_of_camera_params | u(8) |
| for( i = 0; i < camera_params_size; i++ ) | |
| Left_camera_params[i] | u(32) |
| for( i = 0; i < camera_params_size; i++ ) | |
| Right_camera_params[i] | u(32) |
| } | |

FIG. 9

| Parallax_info() { | Descriptor |
|---|---|
| num_of_Global_disparity | u(32) |
| for( i = 0; i < num_of_Global_disparity; i++ ){ | |
| global_disparity_index[i] | u(32) |
| global_disparity[i] | u(16) |
| } | |
| num_of_representative_disparity | u(8) |
| for( i = 0; i < num_of_representative_disparity; i++ ){ | |
| representative_disparity[i] | u(16) |
| } | |
| } | |

METHOD AND APPARATUS FOR GENERATING HEADER INFORMATION OF STEREOSCOPIC IMAGE DATA

CROSS-REFERENCE TO RELATED PATENT APPLICATION

This application claims priority from U.S. Provisional Application No. 60/943,100, filed on Jun. 11, 2007 in the U.S. Patent and Trademark Office, and Korean Patent Application No. 10-2007-0077460, filed on Aug. 1, 2007 in the Korean Intellectual Property Office, the disclosure of which is incorporated herein in its entirety by reference.

BACKGROUND OF THE INVENTION

1. Field of the Invention

Method and apparatuses consistent with the present invention relate to generating header information of stereoscopic image data, and more particularly, to generating header information including mandatory information for restoring and reproducing original images by decoding encoded stereoscopic images.

2. Description of the Related Art

Various methods of transmitting stereoscopic images have been suggested. For example, stereoscopic images may be transmitted using a multi-view video profile (MVP) method according to Moving Picture Experts Group (MPEG)-2 standards, a depth map transmission method according to MPEG-4 multiple auxiliary component (MAC) standards, or a multi-view coding (MVC) method according to MPEG-4 advanced video coding (AVC)/H.264 standards. Multimedia Application Format (MAF) stereoscopic image data standards are now being established.

Figure 1:
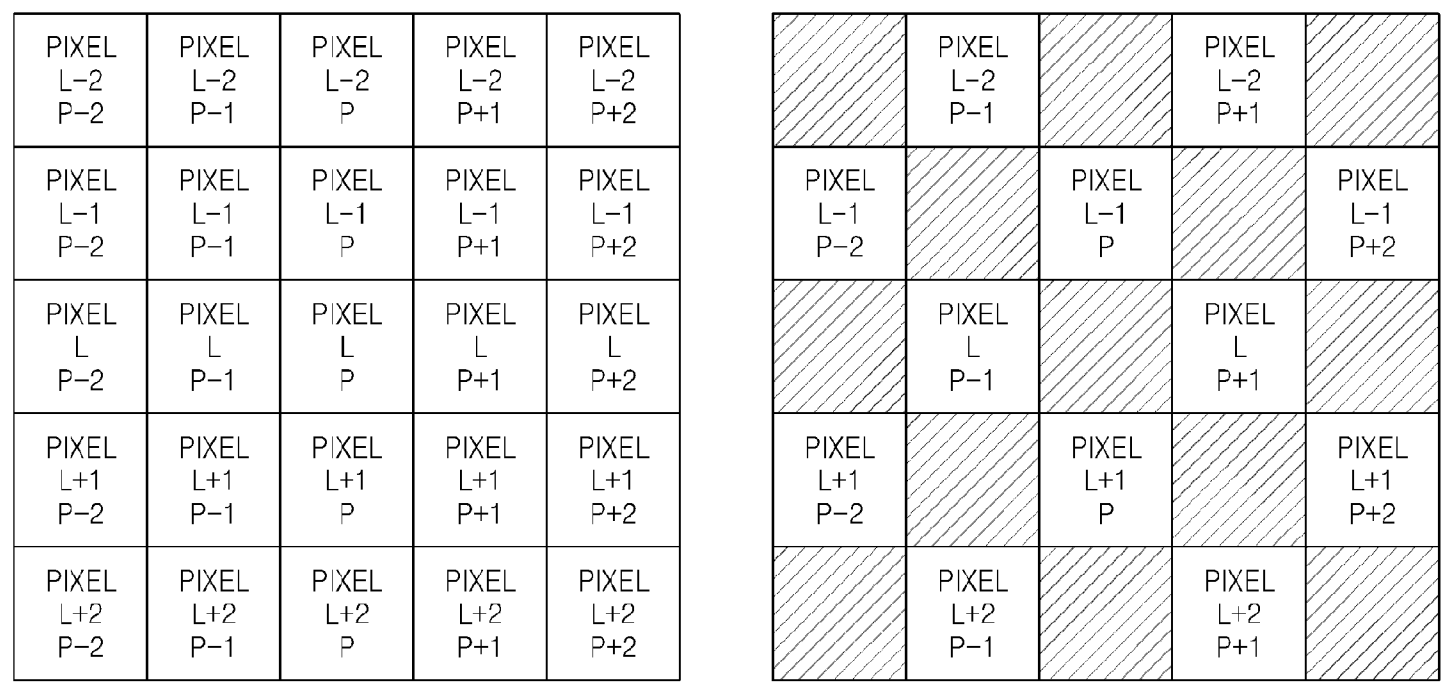

FIG. 1 is a diagram illustrating a related art pixel-based stereoscopic image format for transmitting stereoscopic images.

A sheet of an image format for a stereoscopic image is formed by separately sampling left view and right view images in every alternative block and moving the right view image by one pixel so as not to overlap the left view image. The stereoscopic image may be transmitted and received by using a conventional two-dimensional encoder and decoder. The left view and right view images are formed into a sheet of a stereoscopic image format having the same resolution and thus a large number of pixels are lost.

FIG. 2 is a diagram of a related art apparatus for restoring lost pixels of a pixel-based stereoscopic image format.

Pixels that are lost when the stereoscopic image format is generated as illustrated in FIG. 1 have to be restored so that a display device may reproduce an image of original resolution. Original left view and right view images are restored by extracting directional pixel values of a pixel-based sampled image and summing all directional pixel values multiplied by a predetermined weight.

FIG. 3 is a diagram illustrating a reference structure of a related art International Standards Organization (ISO)-based media file format.

In the conventional ISO-based media file format, substantial media data is stored in a media data (mdat) region and information on characteristics of the media data is stored in a movie data (moov) region.

When the image format illustrated in FIG. 1 is transmitted, a fact that overlap information between left view and right view images is large is used in order to improve transmission efficiency. In other words, the transmission efficiency is improved by reducing the amount of transmission data by combining the left view and right view images in pixel units into a sheet of a mixed image to be transmitted.

However, a conventional stereoscopic image format does not include header information in the movie data (moov) region, the header information including a scale function used when the left view and right view images are combined into the mixed image to be transmitted and information regarding whether the mixed image includes camera information of the left view and right view images.

If a stereoscopic image combined into a mixed image having the image format illustrated in FIG. 1 by using a certain combination method is transmitted, an encoding terminal of a reception terminal does not include information on the combination method used by a transmission terminal and thus the mixed image may not be accurately inverse converted to the original stereoscopic image. Accordingly, although the stereoscopic image is losslessly transmitted using the conventional combination method, the stereoscopic image may not be accurately restored because the reception terminal does not include information on the combination method, a scaling method, and so on.

SUMMARY OF THE INVENTION

The present invention provides a method and apparatus for generating header information of a stereoscopic image combined into a mixed image to be transmitted, the header information including mandatory information for restoring the stereoscopic image by a reception terminal.

The present invention also provides a method and apparatus for generating a stereoscopic image including various pieces of mandatory header information for efficiently recording and transmitting the stereoscopic image and allowing a reception terminal to restore and reproduce original images.

According to an aspect of the present invention, there is provided a method of generating a stereoscopic image bitstream, the method including recording three-dimensional reproduction period information on three-dimensionally reproduced stereoscopic image data of image data to be recorded in a payload region of the stereoscopic image bitstream, in a header region of the stereoscopic image bitstream; recording camera information on cameras used for obtaining a stereoscopic image, in the header region; recording parallax information between base and additional images of the stereoscopic image in the header region; and recording the image data in the payload region of the stereoscopic image bitstream.

The method may further include recording scaling information on a scaling method used when a mixed image having information on the base and additional images is generated, in the header region.

The method may further include recording mixed image formation information on a method of forming a mixed image by combining the base and additional images, in the header region.

The three-dimensional reproduction period information may include the number of three-dimensional reproduction periods and range information of the three-dimensional reproduction periods.

The range information of the three-dimensional reproduction periods may include start index information representing a position index of a start frame of the three-dimensional reproduction periods recorded in the payload region; and end index information representing a position index of an end frame of the three-dimensional reproduction periods recorded in the payload region.

If the three-dimensional reproduction periods are formed of one elementary stream (ES), the start index information and the end index information may be indexes of one ES, and wherein, if the three-dimensional reproduction periods are formed of a plurality of ESs, the start index information and the end index information are indexes of a base ES of the plurality of ESs.

The camera information may include the types of the cameras; and camera parameter information to be recorded if the camera parameter information is transmitted in the stereoscopic image bitstream.

The camera parameter information may include the number of camera parameters; and rotation information, translation information, an image center, a focal length, and an aspect ratio of each of base and additional cameras.

The parallax information may include parallax information on global disparity vectors of the whole stereoscopic image bitstream; and parallax information on representative disparity vectors of a predetermined object of the stereoscopic image bitstream.

The parallax information on the global disparity vectors may include the number of frames recorded in the payload region in which global disparities are changed; indexes of the frames in which the global disparities are changed; and vector values of the global disparities.

The representative disparity vectors may include disparity vectors having minimum and maximum values from among a plurality of disparity vectors; disparity vectors of background and foreground; disparity vectors of a plurality of objects; and the representable minimum and maximum values of a disparity map/depth map.

The parallax information on the representative disparity vectors may include the number of the representative disparity vectors; and vector values of the representative disparity vectors.

The scaling information may include information on at least one of a sampling method, a linear method, a cubic convolution, and a method using a variable scaling function.

The variable scaling function may be a user private function determined by horizontal coefficients, vertical coefficients, the number of the horizontal coefficients, and the number of the vertical coefficients.

The mixed image formation information may include arrangement order information of the base and additional images; width ratio information of the base and additional images; and height ratio information of the base and additional images.

According to another aspect of the present invention, there is provided an apparatus for generating a stereoscopic image bitstream, the apparatus including a three-dimensional reproduction period information recording unit for recording three-dimensional reproduction period information on three-dimensionally reproduced stereoscopic image data of image data to be recorded in a payload region of the stereoscopic image bitstream, in a header region of the stereoscopic image bitstream; a camera information recording unit for recording camera information on cameras used for obtaining a stereoscopic image, in the header region; a parallax information recording unit for recording parallax information between base and additional images of the stereoscopic image in the header region; and a image recording unit for recording the image data in the payload region of the stereoscopic image bitstream.

The apparatus may further include a scaling information recording unit for recording scaling information on a scaling apparatus used when a mixed image having information on the base and additional images is generated, in the header region.

The apparatus may further include a mixed image formation information recording unit for recording mixed image formation information on an apparatus for forming a mixed image by combining the base and additional images, in the header region.

According to another aspect of the present invention, there is provided a stereoscopic image bitstream including a payload region where image data is recorded; and a header region where three-dimensional reproduction period information on three-dimensionally reproduced stereoscopic image data of the image data, camera information on cameras used for obtaining a stereoscopic image, parallax information between base and additional images of the stereoscopic image are recorded.

Scaling information on a scaling method used when a mixed image having information on the base and additional images is generated may be recorded in the header region.

Mixed image formation information on a method of forming a mixed image by combining the base and additional images may be recorded in the header region.

According to another aspect of the present invention, there is provided a computer readable recording medium having recorded thereon a computer program for executing the method of generating a stereoscopic image bitstream.

According to another aspect of the present invention, there is provided an apparatus of decoding a stereoscopic image bitstream comprising a variable length code decoder module, motion compensation/prediction module, inverse transformation module, and inverse quantization module, wherein the stereoscopic image bitstream comprises: three-dimensional reproduction period information related to three-dimensionally reproduced stereoscopic image data of image data recorded in the stereoscopic image bitstream.

The three-dimensional reproduction period information may comprise a number of three-dimensional reproduction periods; and the three-dimensional reproduction periods may be recorded in a payload region of the stereoscopic image bitstream.

The three-dimensional reproduction period information may comprise a number of switches between three-dimensional reproduction period and two-dimensional reproduction period; and the three-dimensional reproduction periods may be recorded in a payload region of the stereoscopic image bitstream.

The three-dimensional reproduction period information may comprise range information of the three-dimensional reproduction periods; and the three-dimensional reproduction periods may be recorded in a payload region of the stereoscopic image bitstream.

The range information of the three-dimensional reproduction periods may comprises: start index information representing a position index of a start frame of the three-dimensional reproduction periods recorded in the payload region; and end index information representing a position index of an end frame of the three-dimensional reproduction periods recorded in the payload region.

If the three-dimensional reproduction periods are formed of one elementary stream, the start index information and the end index information may be indexes of the one elementary stream, and if the three-dimensional reproduction periods are formed of a plurality of elementary streams, the start index information and the end index information may be indexes of a base elementary stream of the plurality of elementary streams.

According to another aspect of the present invention, there is provided an apparatus of decoding a stereoscopic image bitstream comprising a variable length code decoder module, motion compensation/prediction module, inverse transformation module, and inverse quantization module, wherein the stereoscopic image bitstream comprises: camera information related to cameras used for obtaining a stereoscopic image of image data recorded in the stereoscopic image bitstream.

According to another aspect of the present invention, there is provided an apparatus of decoding a stereoscopic image bitstream comprising a variable length code decoder module, motion compensation/prediction module, inverse transformation module, and inverse quantization module, wherein the stereoscopic image bitstream comprises: parallax information between base and additional images of the stereoscopic image of image data recorded in the stereoscopic image bitstream.

The apparatus may further comprise information on whether the stereoscopic image bitstream comprises the parallax information.

According to another aspect of the present invention, there is provided an apparatus of decoding a stereoscopic image bitstream comprising a variable length code decoder module, motion compensation/prediction module, inverse transformation module, and inverse quantization module, wherein the stereoscopic image bitstream comprises: arrangement order information on arrangement of base and additional images for the stereoscopic image in a mixed image including information on the base and additional images.

The apparatus may further comprise width ratio information of the base and additional images; and height ratio information of the base and additional images.

If the mixed image has a vertical line interleaved format, the arrangement order information may represent which one of information of the base and additional images is arranged on odd number vertical lines, and the other is arranged on even number vertical lines.

If the mixed image has a horizontal line interleaved format, the arrangement order information may represent which one of information of the base and additional images is arranged on odd number horizontal lines, and the other is arranged on even number horizontal lines.

If the mixed image has a top-down format, the arrangement order information may represent which one of information of the base and additional images is arranged on an upper side, and the other is arranged on bottom side.

If the mixed image has a side-by-side format, the arrangement order information may represent which one of information of the base and additional images is arranged on a left side, and the other is arranged on a right side.

If the mixed image has a field sequential format, the arrangement order information may represent which one of information of the base and additional images is arranged on odd number fields, and the other is arranged on even number fields.

If the mixed image has a frame sequential format, the arrangement order information may represent which one of information of the base and additional images is arranged on odd number frames, and the other is arranged on even number frames.

If the mixed image has a block interleaved format, the arrangement order information may represent which one of information of the base and additional images is arranged on odd number blocks, and the other is arranged on even number blocks.

If the stereoscopic image data is recorded in base and sub elementary streams, the arrangement order information may represent which one of information of the base and additional images is arranged on the base elementary stream, and the other is arranged on the sub elementary stream.

The stereoscopic image bitstream may further comprise mixed image formation information related to a method of forming a mixed image by combining the base and additional images; and the mixed image formation information may represent whether the mixed image is in at least one of a vertical line interleaved format, a horizontal line interleaved format, a top-down format, a side-by-side format, a field sequential format, a frame sequential format, a block interleaved format, a disparity map format, a depth map format, a disparity+motion map format and a monoscopic image format.

BRIEF DESCRIPTION OF THE DRAWINGS

The above and other aspects of the present invention will become more apparent from the following detailed description of certain exemplary embodiments thereof with reference to the attached drawings in which:

FIG. 1 is a diagram illustrating a related art pixel-based stereoscopic image format for transmitting stereoscopic images;

FIG. 5 is a diagram illustrating syntax of three-dimensional reproduction period information used for generating a stereoscopic image bitstream, according to an exemplary embodiment of the present invention;

FIG. 6A is a diagram illustrating syntax of mixed image formation information used for generating a stereoscopic image bitstream, according to an exemplary embodiment of the present invention;

FIG. 6B is a diagram illustrating a mixed image format type of mixed image formation information used for generating a stereoscopic image bitstream, according to an exemplary embodiment of the present invention;

FIG. 6C is a diagram illustrating an arrangement order of mixed image formation information used for generating a stereoscopic image bitstream, according to an exemplary embodiment of the present invention;

FIG. 7A is a diagram illustrating a scaling method used for generating a stereoscopic image bitstream, according to an exemplary embodiment of the present invention;

FIG. 7B is a diagram illustrating syntax of a scaling method used for generating a stereoscopic image bitstream, according to an exemplary embodiment of the present invention;

FIG. 8A is a diagram illustrating syntax of camera information used for generating a stereoscopic image bitstream, according to an exemplary embodiment of the present invention;

FIG. 8B is a diagram illustrating syntax of camera parameters of camera information used for generating a stereoscopic image bitstream, according to an exemplary embodiment of the present invention;

FIG. 9 is a diagram illustrating syntax of parallax information used for generating a stereoscopic image bitstream, according to an exemplary embodiment of the present invention;

DETAILED DESCRIPTION OF EXEMPLARY EMBODIMENTS OF THE INVENTION

Figure 2:
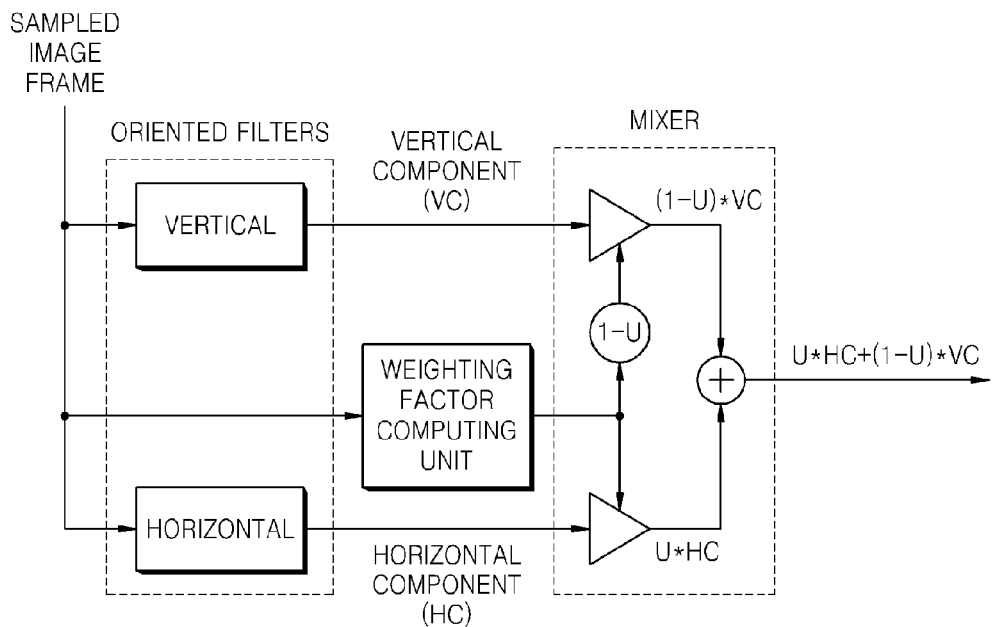
FIG. 2 is a diagram of a related art apparatus for restoring lost pixels of a pixel-based stereoscopic image format.
Figure 3:
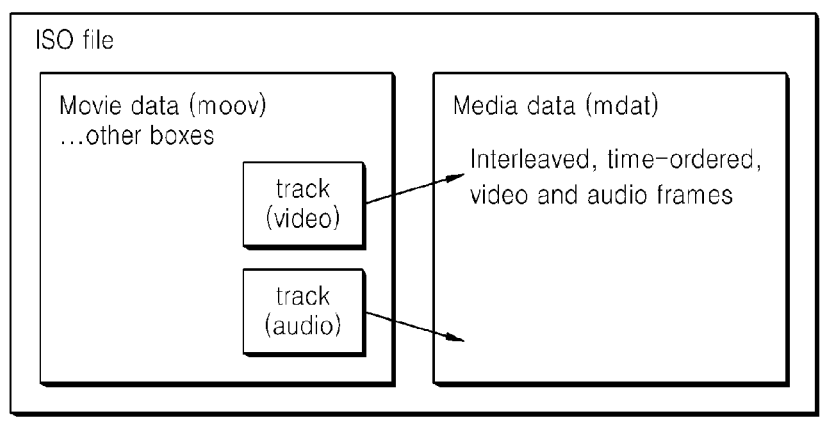
FIG. 3 is a diagram illustrating a reference structure of a related art International Standards Organization (ISO)-based media file format.

Hereinafter, the present invention will be described in detail by explaining exemplary embodiments of the invention with reference to the attached drawings. Like reference numerals in the drawings denote like elements, and thus repeated descriptions will be omitted.

An apparatus for generating a stereoscopic image bitstream, according to exemplary embodiments of the present invention, will now be described in detail with reference to FIGS. 4A and 4B.

Figure 4A:
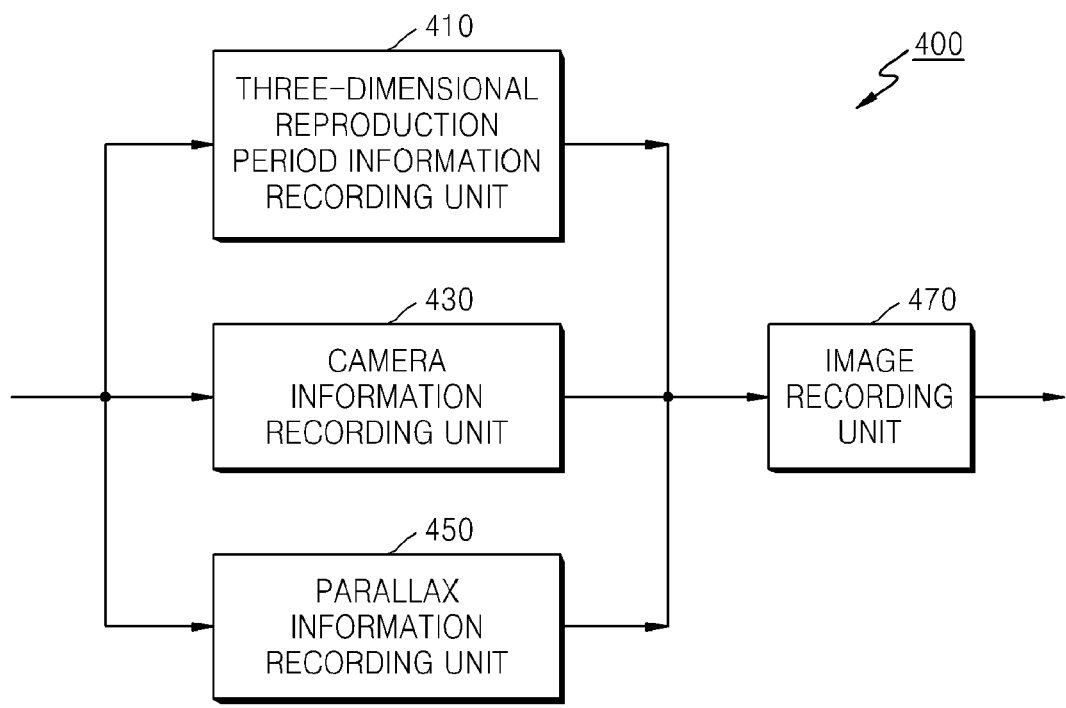
FIG. 4A is a block diagram of an apparatus for generating a stereoscopic image bitstream, according to an exemplary embodiment of the present invention.

FIG. 4A is a block diagram of an apparatus 400 for generating a stereoscopic image bitstream, according to an exemplary embodiment of the present invention.

The apparatus 400 according to the current exemplary embodiment of the present invention includes a three-dimensional reproduction period information recording unit 410, a camera information recording unit 430, a parallax information recording unit 450, and an image recording unit 470.

The three-dimensional reproduction period information recording unit 410 records three-dimensional reproduction period information on three-dimensionally reproduced stereoscopic image data of image data recorded in a payload region of the stereoscopic image bitstream, in a header region of the stereoscopic image bitstream and outputs the three-dimensional reproduction period information to the image recording unit 470.

The camera information recording unit 430 records camera information on cameras used for obtaining a stereoscopic image, in the header region and outputs the camera information to the image recording unit 470.

The parallax information recording unit 450 records parallax information between base and additional images of the stereoscopic image in the header region and outputs the parallax information to the image recording unit 470.

After header information such as the three-dimensional reproduction period information, the camera information, and the parallax information are completely recorded in the header region by the three-dimensional reproduction period information recording unit 410, the camera information recording unit 430, and the parallax information recording unit 450, respectively, the header information is output to the image recording unit 470.

The image recording unit 470 records image data in the payload region of the stereoscopic image bitstream and outputs the stereoscopic image bitstream.

As such, in a stereoscopic image bitstream generated by the apparatus 400 according to the current exemplary embodiment, image data is recorded in a payload region of the stereoscopic image bitstream and header information such as three-dimensional reproduction period information, camera information, and parallax information is recorded in a header region of the stereoscopic image bitstream.

Figure 4B:
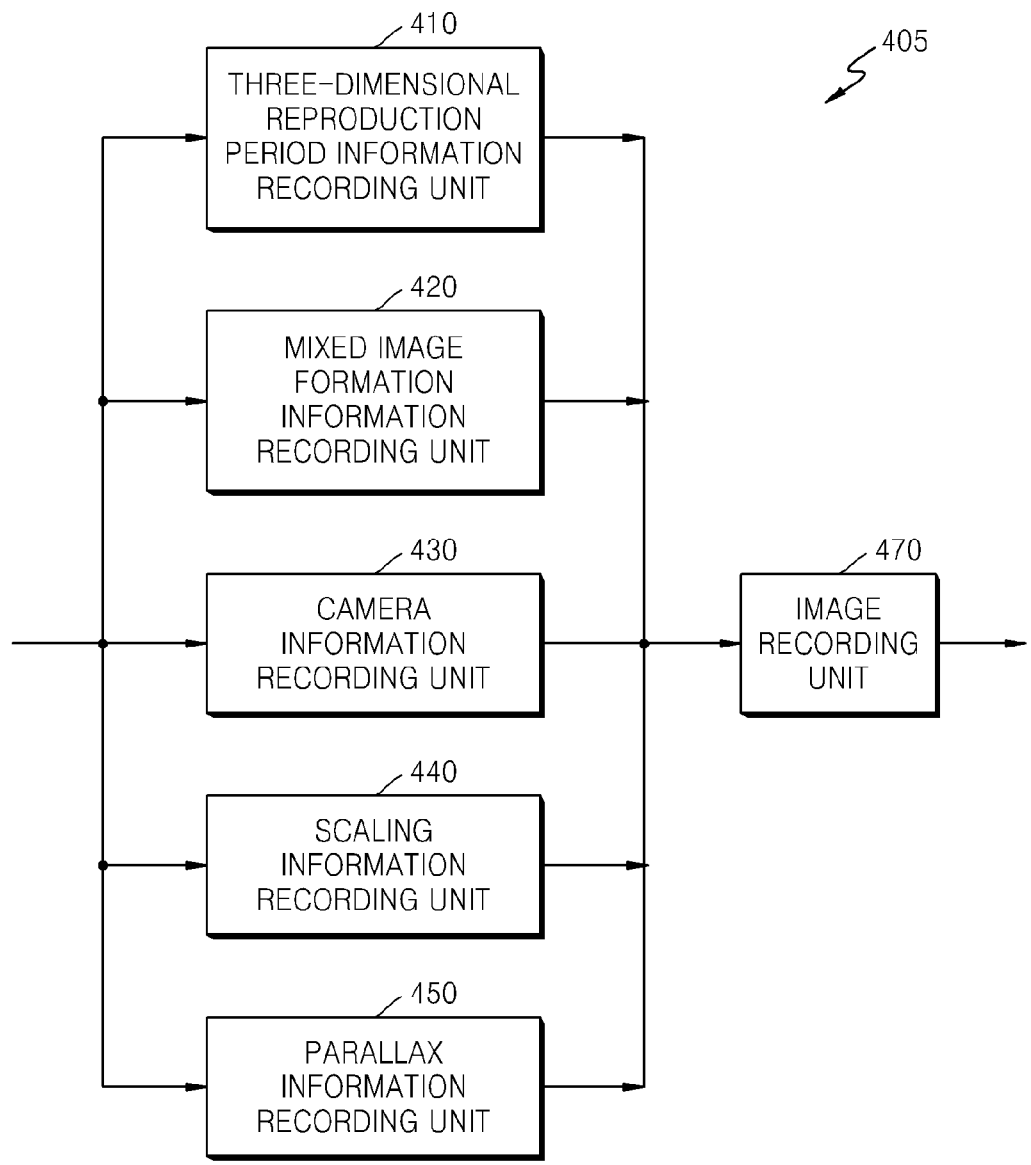
FIG. 4B is a block diagram of an apparatus for generating a stereoscopic image bitstream, according to another exemplary embodiment of the present invention.

FIG. 4B is a block diagram of an apparatus 405 for generating a stereoscopic image bitstream, according to another exemplary embodiment of the present invention.

The apparatus 405 according to the current exemplary embodiment of the present invention includes the three-dimensional reproduction period information recording unit 410, the camera information recording unit 430, the parallax information recording unit 450, and the image recording unit 470 of the apparatus 400 according to the previous exemplary embodiment and illustrated in FIG. 4A, and further includes a mixed image formation information recording unit 420 and a scaling information recording unit 440.

The mixed image formation information recording unit 420 records mixed image formation information on a method of forming a mixed image having information on base and additional images, in a header region and outputs the mixed image formation information to the image recording unit 470.

The scaling information recording unit 440 records scaling information on a scaling method used when the mixed image having the information on the base and additional images is generated, in the header region and outputs the scaling information to the image recording unit 470.

Accordingly, in a stereoscopic image bitstream generated by the apparatus 405 according to the current exemplary embodiment, header information such as three-dimensional reproduction period information, mixed image formation information, camera information, scaling information, and parallax information on image data stored in a payload region is recorded in a header region of the stereoscopic image bitstream.

Header information of a stereoscopic image bitstream generated by an apparatus for generating the stereoscopic image bitstream, according to an exemplary embodiment of the present invention, will now be described in detail with reference to FIGS. 5, 6A, 6B, 6C, 7A, 7B, 8A, 8B, and 9.

FIG. 5 is a diagram illustrating syntax of three-dimensional reproduction period information used for generating a stereoscopic image bitstream, according to an exemplary embodiment of the present invention.

According to an exemplary embodiment of the present invention, three-dimensional reproduction period information 3D_Period is represented by 32 bits (u(32)). The three-dimensional reproduction period information 3D_Period includes information on the number of three-dimensional reproduction periods (number_of_3D_period), start index information (start_position), and end index information (end_position).

The information on the number of three-dimensional reproduction periods number_of_3D_period, represents the number of periods where a user may view image data three-dimensionally.

The start index information, start_position, represents a position index where a start frame of a three-dimensional reproduction period is recorded in a payload region of the stereoscopic image bitstream.

The end index information, end_position, represents a position index where an end frame of the three-dimensional reproduction period is recorded in the payload region of the stereoscopic image bitstream. Every three-dimensional reproduction period needs the start index information, start_position, and the end index information, end_position. Thus, assuming that i is an integer, start index information, start_position[i], and end index information, end_position[i], have to be determined in a range of $0 \leq i \leq$ number_of_3D_period.

According to an exemplary embodiment of the present invention, if a three-dimensional reproduction period is formed of one elementary stream (ES), the start index information start_position and the end index information end_position are indexes of one ES.

According to another exemplary embodiment of the present invention, if a three-dimensional reproduction period is formed of a plurality of ESs, the start index information, start_position, and the end index information, end_position, are indexes of a base ES of the plurality of ESs.

FIG. 6A is a diagram illustrating syntax of mixed image formation information used for generating a stereoscopic image bitstream, according to an exemplary embodiment of the present invention. For example, base and additional images may be left view and right view images, respectively.

StereoFormat_params represents the mixed image formation information. According to the current exemplary embodiment, the mixed image formation information, stereoFormat_params, includes a mixed image format type, stereo_format_type, of a stereoscopic image, and an arrangement order, LR_first, a width ratio, LR_width_ratio, a height ratio, LR_height_ratio, of the base and additional images, a scaling method, scaling_method, and a scaling function, scaling_func.

The mixed image format type, stereo_format_type, represents a format type according to a method of forming a mixed image by combining multi-view two-dimensional images. According to an exemplary embodiment of the present invention, the mixed image format type, stereo_format_type, is represented by eight bits (u(8)). The mixed image format type, stereo_format_type, will now be described in detail with reference to FIG. 6B.

FIG. 6B is a diagram illustrating a mixed image format type, stereo_format_type, of mixed image formation information used for generating a stereoscopic image bitstream, according to an exemplary embodiment of the present invention.

If the mixed image format type, stereo_format_type, is 0, a mixed image has a vertical line interleaved format. In this case, the mixed image is generated by arranging vertical lines of base and additional images alternately on vertical lines of the mixed image.

If the mixed image format type, stereo_format_type, is 1, the mixed image has a horizontal line interleaved format. In this case, the mixed image is generated by arranging horizontal lines of the base and additional images alternately on horizontal lines of the mixed image.

If the mixed image format type, stereo_format_type, is 2, the mixed image has a top-down format. In this case, the mixed image is generated by arranging the base and additional images of which resolutions are reduced by half in a vertical direction, on upper and lower portions of the mixed image, respectively.

If the mixed image format type, stereo_format_type, is 3, the mixed image has a side-by-side format. In this case, the mixed image is generated by arranging the base and additional images of which resolutions are reduced by half in a horizontal direction, on left and right portions of the mixed image, respectively.

If the mixed image format type, stereo_format_type, is 4, the mixed image has a field sequential format. In this case, the mixed image is generated by displaying a base image field and an additional image field alternately on a reproduction unit.

If the mixed image format type, stereo_format_type, is 5, the mixed image has a frame sequential format. In this case, the mixed image is generated by displaying a base image frame and an additional image frame alternately on the reproduction unit.

If the mixed image format type, stereo_format_type, is 6, the mixed image has a block interleaved format. In this case, the mixed image is generated by arranging the base and additional images alternately in block units on blocks of the mixed image.

If the mixed image format type, stereo_format_type, is 7, the mixed image has a disparity map. In this case, the mixed image may be generated by combining the base image and the disparity map.

If the mixed image format type, stereo_format_type, is 8, the mixed image has a depth map. In this case, the mixed image may be generated by combining the base image and the depth map.

If the mixed image format type, stereo_format_type, is 9, the mixed image has a disparity+motion map. In this case, the mixed image may be generated by combining the base image and the disparity+motion map.

If the mixed image format type, stereo_format_type, is 10, the mixed image has a monoscopic image format. In this case, one monoscopic image of the base and additional images is used.

If the mixed image format type, stereo_format_type, is one of 11 through 255, the mixed image has a user private format. In this case, an image format designated by a user is used for forming the mixed image.

Referring back to FIG. 6A, the arrangement order, LR_first, is a parameter representing an arrangement order of the base and additional images. For example, the arrangement order, LR_first, represents the arrangement order of the left view and right view images. According to an embodiment of the present invention, the arrangement order, LR_first, is represented by 1 bit (u(1)). The arrangement order, LR_first, will now be described in detail with reference to FIG. 6C.

FIG. 6C is a diagram illustrating an arrangement order, LR_first, of mixed image formation information used for generating a stereoscopic image bitstream, according to an exemplary embodiment of the present invention.

If the arrangement order, LR_first, is 0, a left view image is a base image so that image data of the left view image is arranged on odd number vertical lines in a vertical line interleaved format, on odd number horizontal lines in a horizontal line interleaved format, on an upper side in a top-down format, on a left side in a side-by-side format, on odd number fields in a field sequential format, on odd number frames in a frame sequential format, and on odd number blocks in a block interleaved format. Likewise, a right view image is an additional image so that image data of the right view image is arranged on the opposite region to the region where the image data of the left view image is arranged in the above-described mixed image formats.

If the arrangement order, LR_first, is 1, the right view image is the base image. In this case, arrangement of the image data of the left view and right view images is opposite to the case when the arrangement order, LR_first, is 0.

Referring back to FIG. 6A, the width ratio, LR_width_ratio, is a parameter representing a width ratio between the base and additional images if a mixed image format is a side-by-side format or a top-down format. According to an embodiment of the present invention, the width ratio, LR_width_ratio, is represented by 32 bits (u(32)). The width ratio, LR_width_ratio, may be calculated using Equation 1 as follows.

$$LR\_width\_ratio = width_{base}/width_{additional} \quad [\text{Equation 1}]$$

The height ratio, LR_height_ratio, is a parameter representing a height ratio between the base and additional images if the mixed image format is the side-by-side format or the top-down format. According to an exemplary embodiment of the present invention, the height ratio, LR_height_ratio, is represented by 32 bits (u(32)). The height ratio, LR_height_ratio, may be calculated using Equation 2 as follows.

$$LR\_height\_ratio = height_{base}/height_{additional} \quad \text{[Equation 2]}$$

The scaling method, scaling_method, is a parameter representing a scaling method used when the left view and right view images are combined in a case of one ES. The scaling method, scaling_method, is required for accurately restoring the left view and right view images by a decoding unit. According to an exemplary embodiment of the present invention, the scaling method, scaling_method, is represented by 8 bits (u(8)). The scaling method, scaling_method, will now be described in detail with reference to FIG. 7A.

FIG. 7A is a diagram illustrating a scaling method, scaling_method, used for generating a stereoscopic image bitstream, according to an exemplary embodiment of the present invention.

If the scaling method, scaling_method, is 0, a stereoscopic image has been scaled using a sampling method. In the sampling method, a monoscopic image is scaled by extracting pixels at predetermined periods.

If the scaling method, scaling_method, is 1, the stereoscopic image has been scaled using a linear method. In the linear method, pixels of a mixed image are generated using pixel values calculated by a linear equation using one or more pixel values of the monoscopic image.

If the scaling method, scaling_method, is 2, the stereoscopic image has been scaled using a cubic convolution method. In the cubic convolution method, the pixels of the mixed image are generated using average values calculated according to distances of sixteen neighboring pixels surrounding a current pixel.

If the scaling method, scaling_method, is one of 3 through 255, the stereoscopic image has been scaled using a user private scaling function.

FIG. 7B is a diagram illustrating syntax of a scaling method used for generating a stereoscopic image bitstream, according to an exemplary embodiment of the present invention.

Scaling_func represents a scaling function determined by a user if a scaling method, scaling_method, is one of 3 through 255. According to the current exemplary embodiment, horizontal and vertical two-dimensional scaling function coefficients are required in order to determine the scaling method, scaling_method.

Number_of_hor_coeff represents the number of horizontal coefficients of the scaling function determined by the user. According to an exemplary embodiment of the present invention, the number of horizontal coefficients, number_of_hor_coeff, is represented by eight bits (u(8)).

Hor_scaling_coeff represents a horizontal coefficient of the scaling function determined by the user. The horizontal coefficient, hor_scaling_coeff, is required for as many as the number of horizontal coefficients, number_of_hor_coeff. Thus, assuming that i is an integer, a horizontal coefficient, hor_scaling_coeff[i], has to be determined in a range of $0 \leq i <$ number_of_hor_coeff. According to an exemplary embodiment of the present invention, the horizontal coefficient, hor_scaling_coeff[i], is represented by 32 bits (u(32)).

Assuming that $y_{hor}[i]$ represents a horizontal pixel value of a scaled image, $x_{hor}[i]$ represents the horizontal pixel value of an original image, and $h_{hor}[i]$ represents the horizontal pixel value of the scaling function determined by the user, the relationship among $y_{hor}[i]$, $x_{hor}[i]$, and $h_{hor}[i]$ is represented as Equation 3 as follows.

$$y_{hor}[i] = x_{hor}[i] * h_{hor}[i], \quad \text{[Equation 3]}$$

where * represents a convolution operation.

Number_of_ver_coeff represents the number of vertical coefficients of the scaling function determined by the user. According to an exemplary embodiment of the present invention, the number of vertical coefficients, number_of_ver_coeff, is represented by 8 bits (u(8)).

Ver_scaling_coeff represents a vertical coefficient of the scaling function determined by the user. The vertical coefficient, ver_scaling_coeff, is required for as many as the number of vertical coefficients number_of_ver_coeff. Thus, assuming that i is an integer, a vertical coefficient, ver_scaling_coeff[i], has to be determined in a range of $0 \leq i <$ number_of_ver_coeff. According to an exemplary embodiment of the present invention, the vertical coefficient, ver_scaling_coeff[i], is represented by 32 bits (u(32)).

Assuming that $y_{ver}[i]$ represents a vertical pixel value of the scaled image, $x_{ver}[i]$ represents the vertical pixel value of the original image, and $h_{ver}[i]$ represents the vertical pixel value of the scaling function determined by the user, the relationship among $y_{ver}[i]$, $x_{ver}[i]$, and $h_{ver}[i]$ is represented as Equation 3 as follows.

$$y_{ver}[i] = x_{ver}[i] * h_{ver}[i], \quad \text{[Equation 4]}$$

where * represents a convolution operation.

FIG. 8A is a diagram illustrating syntax of camera information used for generating a stereoscopic image bitstream, according to an exemplary embodiment of the present invention.

Camera_distance represents the distance between stereoscopic cameras. According to an exemplary embodiment of the present invention, the camera distance, camera_distance, is represented by 32 bits (u(32)).

View_type represents a view type such as a crossed-eye view or a parallel-eye. According to an exemplary embodiment of the present invention, the view type, view_type, is represented by 1 bit (u(1)).

View_distance_vs_depth represents a ratio of a viewing distance to a use/validity depth. According to an exemplary embodiment of the present invention, the viewing distance to depth ratio view_distance_vs_depth, is represented by 32 bits (u(32)).

Camera_type represents the camera type of a camera used when a stereoscopic image is obtained. According to an exemplary embodiment of the present invention, the camera type camera_type, is represented by 8 bits (u(8)).

Is_camera_params represents camera parameter transmission information whether camera parameters, camera_params, are transmitted or not. If the camera parameter transmission information, is_camera_params, is not 0, the camera parameters camera_params, of base and additional cameras are transmitted. According to an exemplary embodiment of the present invention, the camera parameter transmission information, is_camera_params, is represented by 1 bit (u(1)).

Is_parallax_info represents parallax information transmission information whether parallax information, parallax_info, is transmitted or not. If the parallax information transmission information, is_parallax_info is not 0, the parallax information, parallax_info, is transmitted. According to an exemplary embodiment of the present invention, the parallax information transmission information, is_parallax_info, is represented by 1 bit (u(1)).

FIG. 8B is a diagram illustrating syntax of camera parameters, camera_params, of camera information used for generating a stereoscopic image bitstream, according to an exemplary embodiment of the present invention. According to the current exemplary embodiment, base and additional images may be left view and right view images, respectively.

The camera parameters, camera_params, include the number of camera parameters, number_of_camera_params, left camera parameters, left_camera_params, and right camera parameters, right_camera_params.

The number of camera parameters, number_of_camera_params, represents the number of camera parameters, camera_params. According to an exemplary embodiment of the present invention, the number of camera parameters, number_of_camera_params, is represented by 8 bits (u(8)).

The left camera parameters, left_camera_params, include parameters on peculiar characteristics of a left camera, such as rotation information, translation information, an image center, a focal length, and an aspect ratio. According to an exemplary embodiment of the present invention, the left camera parameters, left_camera_params, are represented by 32 bits (u(32)).

The right camera parameters, right_camera_params, include parameters on peculiar characteristics of a right camera, such as rotation information, translation information, an image center, a focal length, and an aspect ratio. According to an exemplary embodiment of the present invention, the right camera parameters, right_camera_params, are represented by 32 bits (u(32)).

FIG. 9 is a diagram illustrating syntax of parallax information, parallax_info, used for generating a stereoscopic image bitstream, according to an exemplary embodiment of the present invention.

The parallax information, parallax_info, represents parallax information between a global disparity vector, global_disparity, that occurs in a whole stereoscopic image and a representative disparity vector, representative_disparity, that occurs in a predetermined object of the stereoscopic image. The representative disparity vector, representative_disparity, may be a disparity vector having the minimum vector or a disparity vector having the maximum vector from among a plurality of disparity vectors. The object in which the representative disparity vector, representative_disparity, occurs may be a background, a foreground, or any other individual object.

The parallax information, parallax_info, includes the number of global disparity vectors, num_of_global_disparity, a global disparity start index, global_disparity_index, the global disparity vector, global_disparity, the number of representative disparity vectors, num_of_representative_disparity, and the representative disparity vector representative_disparity.

The number of global disparity vectors, num_of_global_disparity, represents the number of frames recorded in a payload region in which global disparities are changed. According to an exemplary embodiment of the present invention, the number of global disparity vectors num_of_global_disparity, is represented by 32 bits (u(32)).

The global disparity start index, global_disparity_index, represents an index of a frame in which a global disparity is started from among frames in which the global disparity vector, global_disparity, occurs. According to an exemplary embodiment of the present invention, the global disparity start index, global_disparity_index, is represented by 32 bits (u(32)).

The global disparity vector, global_disparity, represents a vector of the global disparity. According to an exemplary embodiment of the present invention, the global disparity vector global_disparity, is represented by 16 bits (u(16)).

Assuming that i is an integer and is included in a range of 0≦i<num_of_global_disparity, a global disparity vector, global_disparity[i], is a vector value of the global disparity between a disparity global disparity start index, global_disparity_index[i], and a global disparity start index, global_disparity_index[i+1].

The number of representative disparity vectors, num_of_representative_disparity, represents the number of representative disparities. According to an exemplary embodiment of the present invention, the number of representative disparity vectors, num_of_representative_disparity, is represented by 8 bits (u(8)).

The representative disparity vector, representative_disparity, represents a vector value of a representative disparity. According to an exemplary embodiment of the present invention, the representative disparity vector, representative_disparity, is represented by 16 bits (u(16)).

Assuming that i is an integer and is included in a range of 0≦i<num_of_representative_disparity, a representative disparity vector, representative_disparity[i], represents a representative disparity vector value. The representative disparity vector value may be the minimum or maximum value of a disparity vector, a disparity vector of a representative object, the minimum or maximum value that can be represented by a disparity/depth vector map.

Figure 10:
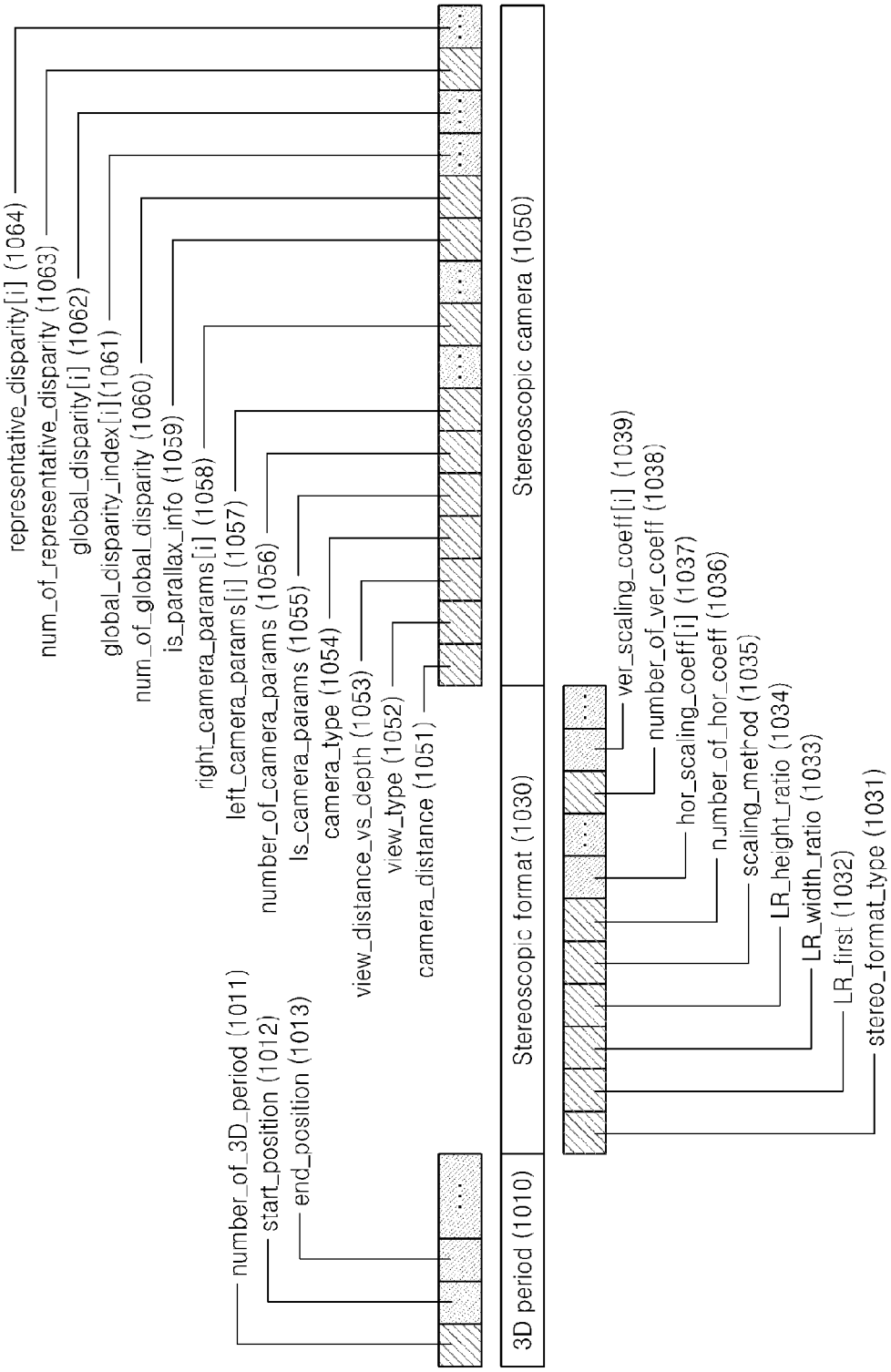
FIG. 10 is a diagram illustrating a header region of a stereoscopic image bitstream, according to an exemplary embodiment of the present invention.

FIG. 10 is a diagram illustrating a header region of a stereoscopic image bitstream, according to an exemplary embodiment of the present invention.

The header region of the stereoscopic image bitstream generated by the apparatus 400 illustrated in FIG. 4 or the apparatus 405 illustrated in FIG. 4B, includes a three-dimensional reproduction information region 3D_period 1010, a mixed image formation information region Stereoscopic format 1030, and a camera information region Stereoscopic camera 1050.

The three-dimensional reproduction information region 3D_period 1010 includes the number of three-dimensional reproduction periods number_of_3D_period 1011, start index information start_position 1012, and end index information end_position 1013.

The mixed image formation information region Stereoscopic format 1030 includes a mixed image format type stereo_format_type 1031 of a stereoscopic image, and an arrangement order LR_first 1032 of base and additional images, a width ratio LR_width_ratio 1033 of the base and additional images, a height ratio LR_height_ratio 1034 of the base and additional images, a scaling method scaling_method 1035, the number of horizontal coefficients number_of_hor_coeff 1036 of a scaling function, a horizontal coefficient hor_scaling_coeff[i] 1037 of the scaling function, the number of vertical coefficients number_of_ver_coeff 1038 of the scaling function, and a vertical coefficient ver_scaling_coeff[i] 1039 of the scaling function.

The camera information region Stereoscopic camera 1050 includes a camera distance camera_distance 1051 between stereoscopic cameras, a view type view_type 1052 of the stereoscopic image, a viewing distance to depth ratio view_distance_vs_depth 1053, a camera type camera_type 1054 on cameras used for obtaining the stereoscopic image, camera parameter transmission information is_camera_params 1055, the number of camera parameters number_of_camera_params 1056, left camera parameters left_camera_params 1057, and right camera parameters right_camera_params 1058.

The camera information region Stereoscopic camera 1050 further includes parallax information transmission information is_parallax_info 1059, the number of global disparity vectors num_of_global_disparity 1060, a global disparity start index global_disparity_index[i] 1061, a global disparity vector global_disparity[i] 1062, the number of representative disparity vectors num_of_representative_disparity 1063, and a representative disparity vector representative_disparity[i] 1064.

Figure 11A:
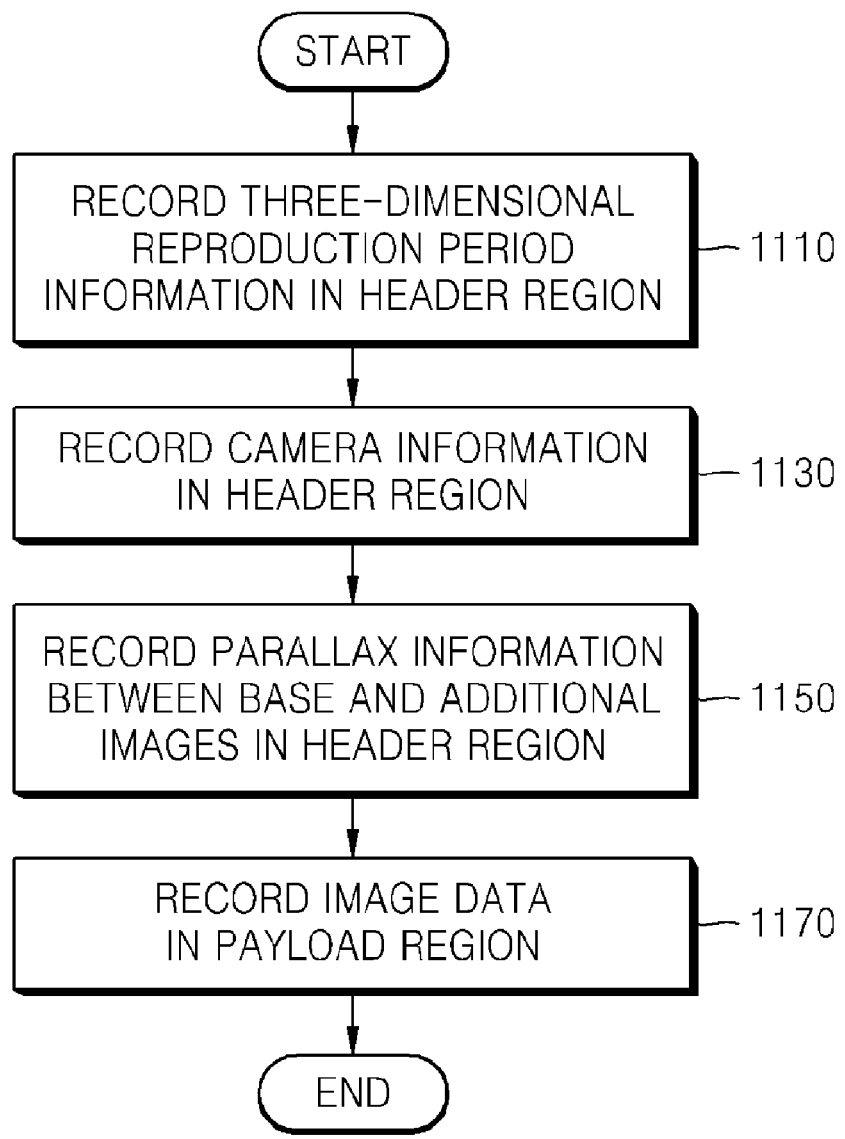
FIG. 11A is a flowchart illustrating a method of generating a stereoscopic image bitstream, according to an exemplary embodiment of the present invention.

FIG. 11A is a flowchart illustrating a method of generating a stereoscopic image bitstream, according to an exemplary embodiment of the present invention.

In operation 1110, three-dimensional reproduction period information on three-dimensionally reproduced stereoscopic image data of image data to be recorded in a payload region of the stereoscopic image bitstream is recorded in a header region of the stereoscopic image bitstream.

In operation 1130, camera information on cameras used for obtaining a stereoscopic image is recorded in the header region.

In operation 1150, parallax information between base and additional images of the stereoscopic image is recorded in the header region.

In operation 1170, the image data is recorded in the payload region of the stereoscopic image bitstream.

Figure 11B:
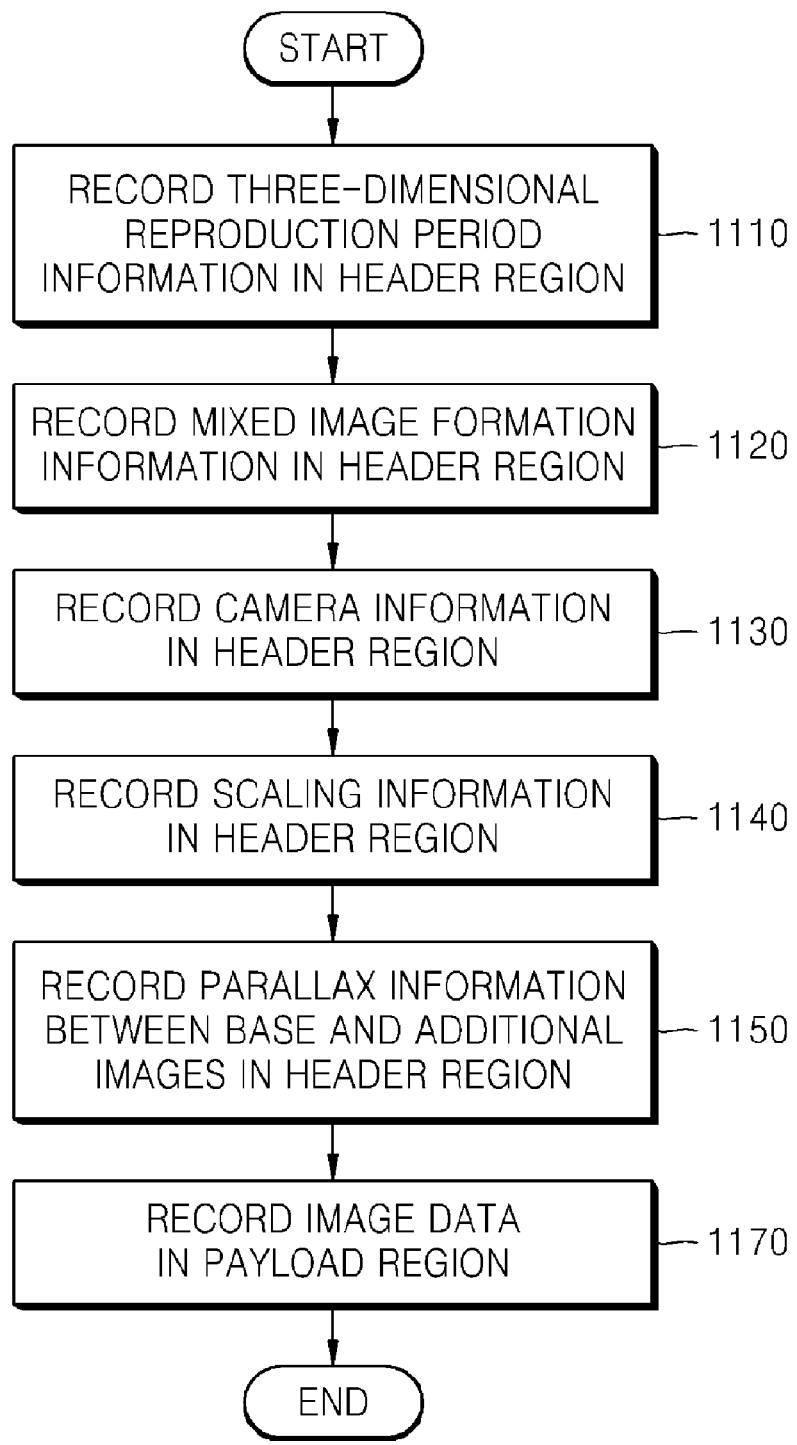
FIG. 11B is a flowchart illustrating a method of generating a stereoscopic image bitstream, according to another exemplary embodiment of the present invention.

FIG. 11B is a flowchart illustrating a method of generating a stereoscopic image bitstream, according to another exemplary embodiment of the present invention.

In operation 1110, three-dimensional reproduction period information on three-dimensionally reproduced stereoscopic image data of image data to be recorded in a payload region of the stereoscopic image bitstream is recorded in a header region of the stereoscopic image bitstream.

In operation 1120, mixed image formation information on a method of forming a mixed image by combining base and additional images is recorded in the header region.

In operation 1130, camera information on cameras used for obtaining a stereoscopic image is recorded in the header region.

In operation 1140, scaling information on a scaling method used when the mixed image having the information on the base and additional images is generated is recorded in the header region.

In operation 1150, parallax information between the base and additional images of the stereoscopic image is recorded in the header region.

In operation 1170, the image data is recorded in the payload region of the stereoscopic image bitstream.

The invention can also be embodied as computer readable codes on a computer readable recording medium. The computer readable recording medium is any data storage device that can store data which can be thereafter read by a computer system.

Figure 12:
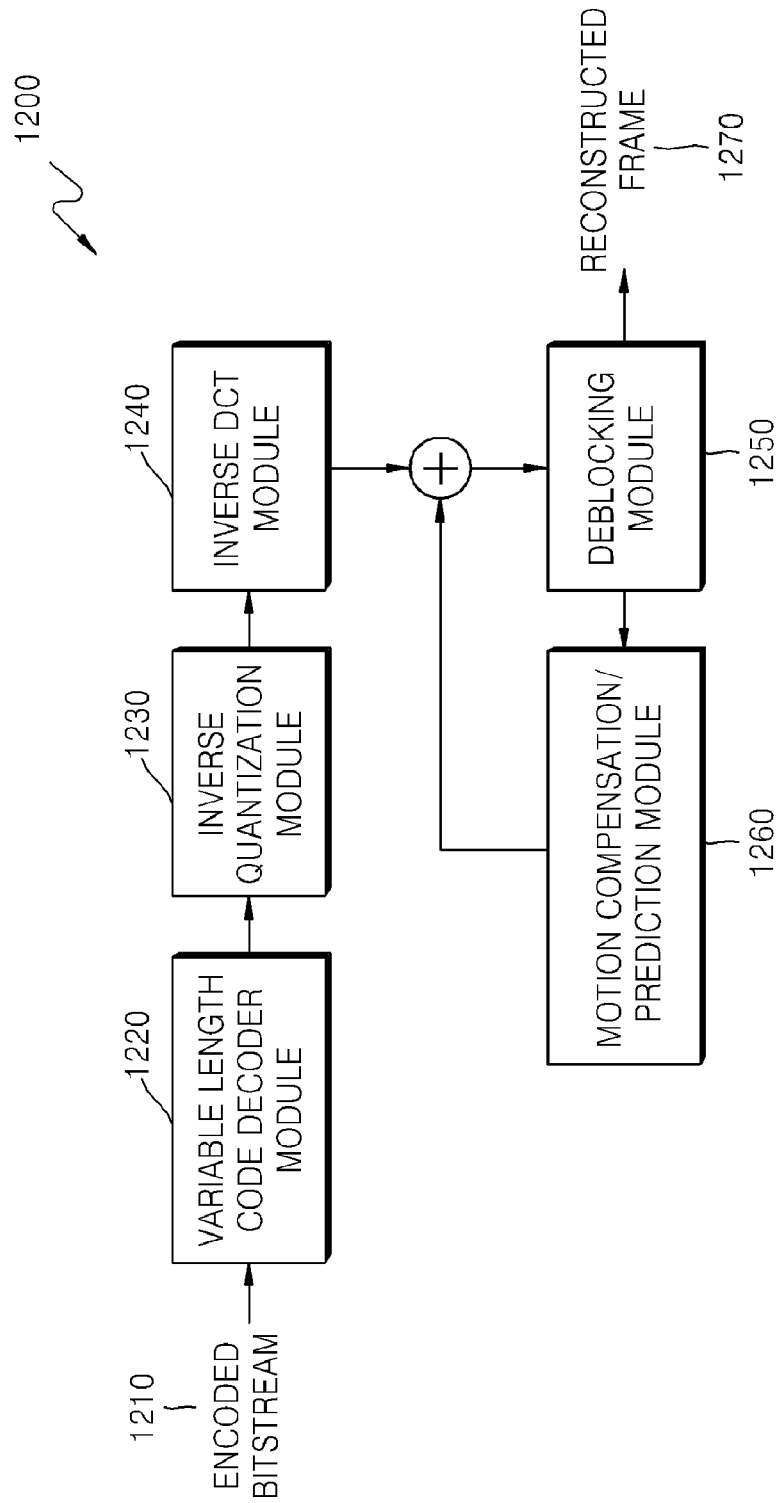
FIG. 12 is a block diagram of an apparatus for decoding a stereoscopic image bitstream, according to an exemplary embodiment of the present invention.

FIG. 12 is a block diagram of an apparatus for decoding a stereoscopic image bitstream, according to an exemplary embodiment of the present invention.

The apparatus 1200 for decoding a stereoscopic image bitstream, in a MPEG system, according to the exemplary embodiment of the present invention includes a variable length code (VLC) decoder module 1220, an inverse quantization module 1230, an inverse discrete cosine transformation (inverse DCT, IDCT) module 1240, a deblocking module 1250 and a motion compensation/prediction module 1260.

The apparatus 1200 for decoding a stereoscopic image bitstream receives encoded stereoscopic bitstreams 1210 and outputs reconstructed frames 1270. This stereoscopic image bitstream 1210 comprises at least one of the three-dimensional reproduction period information, the camera information, the parallax information, the arrangement order information, and the mixed image formation information.

According to an exemplary embodiment of the present invention in the apparatus 1200, the encoded stereoscopic bitstream 1210 may be parsed before execution of decoding processing. By parsing the encoded stereoscopic bitstream 1210, at least one of the three-dimensional reproduction period information, the camera information, the parallax information, the arrangement order information, and the mixed image formation information may be extracted from the header region of the stereoscopic image bitstream. The extracted information regarding to the stereoscopic image from the header region of the stereoscopic image bitstream may be used to display the reconstructed frames 1270 in 2D or 3D display mode by display devices.

The three-dimensional reproduction period information may comprise a number of the three-dimensional reproduction periods, a number of switches between three-dimensional reproduction period and two-dimensional reproduction period, or range information of three-dimensional reproduction periods. The stereoscopic image bitstream 1210 may comprise several information related to the stereoscopic images as described above referring to FIGS. 5, 6A, 6B, 6C, 7A, 7B, 8A, 8B, 9, and 10.

The variable length code (VLC) decoder module 1220 performs VLC decoding for the encoded the stereoscopic bitstreams 1210 and outputs quantized DCT coefficients. Variable length code (VLC) is a kind of coding theory used in data compression schemes.

The inverse quantization module 1230 and the IDCT module 1240 perform inverse quantization and IDCT for the quantized DCT coefficients, respectively. As the time/frequency transformation is not limited to DCT and one of other transformations can be used in the data compression schemes, the quantized coefficients are not quantized DCT coefficients, either. In this case, the inverse transformation is performed by other corresponding time/frequency transformation, not the IDCT module 1240.

The deblocking module 1250 performs deblocking to blocks in decoded images. It may improve visual quality and prediction performance by smoothing the sharp edges when block coding techniques are used. If a block-based scheme is not used in the data compression procedure, the procedure by the deblocking module 1250 can be skipped before reconstructing the stereoscopic images 1270.

The motion compensation/prediction module 1270 performs motion compensations and prediction to the deblocked images, for example, using motion vectors. Motion compensated frames or motion predicted frames from the motion compensation/prediction module 1270 are added to the output from the inverse DCT module 1240, and deblocked by the deblocking module 1250. These procedures are performed recursively and reconstructed frames are decoded according to an exemplary embodiment of the present invention.

As described above, according to the present invention, stereoscopic image data may be efficiently transmitted and recorded, and be reproduced for general purposes by using mandatory header information of various stereoscopic image formats.

In other words, parallax information, camera information, mixed image formation information, three-dimensional reproduction information, and scaling information of stereoscopic image data are recorded in a header region of the stereoscopic image data and thus a reception terminal may accurately recognize the stereoscopic image data and may efficiently realize a three-dimensional reproduction region by using the above-described information.

Furthermore, camera parameters and partial parallax information may be inserted into header information of stereoscopic image data so as to be easily used for post processing that may have to be performed after a decoding terminal decodes the stereoscopic image data.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A method of reconstructing a stereoscopic image from a stereoscopic image bitstream into which stereoscopic image data is inserted, the method comprising:
    parsing the stereoscopic image bitstream and extracting attribute information regarding the stereoscopic image from the stereoscopic image bitstream;
    extracting mixed image formation information representing a format for forming a mixed image by combining base-view and additional-view images, from the attribute information regarding the stereoscopic image;
    extracting arrangement order information representing an arrangement order of the base-view and additional-view images of the stereoscopic image in the mixed image including data of the base-view and additional-view images, from the attribute information regarding the stereoscopic image; and
    reconstructing the stereoscopic image using the stereoscopic image data extracted from the stereoscopic image bitstream,
    wherein the attribute information regarding the stereoscopic image is used to reproduce the reconstructed stereoscopic image in a two-dimensional or three-dimensional reproduction mode on a display device,
    wherein the mixed image formation information represents one of a side-by-side format, a vertical line interleaved format, a frame sequential format, and a base/additional-view sequence format which represents that the base and additional images are inserted into the base and sub elementary streams, respectively, and
    wherein at least one of the parsing the stereoscopic image bitstream, the extracting the mixed image formation information, the extracting the arrangement order information and the reconstructing the stereoscopic image is performed by a hardware processor.

2. The method of claim 1, wherein the reconstructing the stereoscopic image comprises constructing the base-view and additional-view images from the stereoscopic image data based on the attribute information regarding the stereoscopic image, and reproducing the base-view and additional-view images in the two-dimensional or three-dimensional reproduction mode based on the attribute information regarding the stereoscopic image and the arrangement order information.

3. The method of claim 1, wherein, if the mixed image is formed in the vertical line interleaved format, the arrangement order information represents which one of the base-view and additional-view images is arranged on odd number vertical lines of the mixed image, and which one of the base-view and additional-view images is arranged on even number vertical lines of the mixed image.

4. The method of claim 1, wherein, if the mixed image is formed in the side-by-side format, the arrangement order information represents which one of the base-view and additional-view images is arranged on a left side of the mixed image, and which one of the base-view and additional-view images is arranged on a right side of the mixed image.

5. The method of claim 1, wherein, if the mixed image is in the frame sequential format, the arrangement order information represents which one of the base-view and additional-view images is arranged on odd number frames of the mixed image, and which one of the base-view and additional-view images is arranged on even number frames of the mixed image.

6. The method of claim 1, wherein, if the mixed image is formed in the base/additional-view sequence format representing that the base-view and additional-view images are inserted into base and sub elementary streams, respectively, the arrangement order information represents which one of the base-view and additional-view images is arranged on the base elementary stream, and which one of the base-view and additional-view images is arranged on the sub elementary stream.

7. An apparatus for reconstructing a stereoscopic image from a stereoscopic image bitstream into which stereoscopic image data is inserted, the apparatus comprising:
    an attribute information extraction unit which parses the stereoscopic image bitstream and extracts attribute information regarding the stereoscopic image from the stereoscopic image bitstream;
    a mixed image formation information extraction unit which extracts mixed image formation information representing a format for forming a mixed image by combining base-view and additional-view images, from the attribute information regarding the stereoscopic image;
    an arrangement order information extraction unit which extracts arrangement order information representing an arrangement order of the base-view and additional-view images in the mixed image including data of the base-view and additional-view images, from the attribute information regarding the stereoscopic image; and
    a reconstruction unit which reconstructs the stereoscopic image using the stereoscopic image data extracted from the stereoscopic image bitstream,
    wherein the attribute information regarding the stereoscopic image is used to reproduce the reconstructed stereoscopic image in a two-dimensional or three-dimensional reproduction mode on a display device, and
    wherein the mixed image formation information represents one of a side-by-side format, a vertical line interleaved format, a frame sequential format, and a base/additional-view sequence format which represents that the base and additional images are inserted into the base and sub elementary streams, respectively,
    wherein at least one of the attribute information extraction unit, the mixed image formation information extraction unit, the arrangement order information extraction unit and the reconstruction unit is a hardware processor.

* * * * *